US012517260B2

(12) United States Patent
Fetter-Degges et al.

(10) Patent No.: US 12,517,260 B2
(45) Date of Patent: Jan. 6, 2026

(54) SYSTEMS AND METHODS FOR REDUNDANT INTEGRITY MONITORING

(71) Applicant: TRX Systems, Inc., Greenbelt, MD (US)

(72) Inventors: Jonathan Fetter-Degges, Washington, DC (US); John Karvounis, Bowie, MD (US); Carole Teolis, Glendale, MD (US)

(73) Assignee: TRX SYSTEMS, INC., Greenbelt, MD (US)

( * ) Notice: Subject to any disclaimer, the term of this patent is extended or adjusted under 35 U.S.C. 154(b) by 632 days.

(21) Appl. No.: 17/894,660

(22) Filed: Aug. 24, 2022

(65) Prior Publication Data
US 2023/0065658 A1 Mar. 2, 2023

Related U.S. Application Data

(60) Provisional application No. 63/236,559, filed on Aug. 24, 2021.

(51) Int. Cl.
*G01S 19/21* (2010.01)
*G01S 19/08* (2010.01)
*G01S 19/37* (2010.01)
G01S 19/39 (2010.01)
G01S 19/45 (2010.01)

(52) U.S. Cl.
CPC .............. *G01S 19/21* (2013.01); *G01S 19/08* (2013.01); *G01S 19/37* (2013.01); *G01S 19/396* (2019.08); *G01S 19/45* (2013.01)

(58) Field of Classification Search
CPC .......... G01S 19/21; G01S 19/08; G01S 19/37; G01S 19/45; G01S 19/396
See application file for complete search history.

(56) References Cited

U.S. PATENT DOCUMENTS

| 6,024,655 | A  | 2/2000  | Coffee          |
| 6,560,531 | B1 | 5/2003  | Joshi           |
| 7,106,189 | B2 | 9/2006  | Burnenske et al.|
| 7,299,056 | B2 | 11/2007 | Anderson        |
| 7,304,571 | B2 | 12/2007 | Halsey et al.   |

(Continued)

FOREIGN PATENT DOCUMENTS

| WO | WO 2009/021068 A1 | 2/2009 |
| WO | WO 2011/097018 A1 | 8/2011 |

(Continued)

OTHER PUBLICATIONS

U.S. Appl. No. 13/566,956, filed Aug. 3, 2012, Karvounis.

(Continued)

*Primary Examiner* — William Kelleher
*Assistant Examiner* — Ismaaeel A. Siddiquee
(74) *Attorney, Agent, or Firm* — BakerHostetler

(57) ABSTRACT

System, computer program products, and methods for detecting and compensating for sensor interference. Sensor interference may result from environmental interference or from electronic signal interference. Sensor location input may be adapted or rejected when interference is detected. The system can monitor the accuracy, as well as the integrity, of all navigation sensors. The system can also automatically eliminate the faulty or compromised data from a final navigation solution.

13 Claims, 5 Drawing Sheets

(56) References Cited

U.S. PATENT DOCUMENTS

| | | |
|---|---|---|
| 7,890,262 B2 | 2/2011 | Judd et al. |
| 8,032,153 B2 | 10/2011 | Dupray et al. |
| 8,145,419 B2 | 3/2012 | Onome et al. |
| 8,150,650 B2 | 4/2012 | Goncalves et al. |
| 8,331,335 B2 | 12/2012 | Chhabra |
| 8,462,745 B2 | 6/2013 | Alizadeh-Shabdiz |
| 8,473,241 B2 | 6/2013 | Foxlin |
| 8,504,292 B1 | 8/2013 | Cote et al. |
| 8,521,418 B2 | 8/2013 | Ma et al. |
| 8,538,687 B2 | 9/2013 | Plocher et al. |
| 8,688,375 B2 | 4/2014 | Funk et al. |
| 8,706,414 B2 | 4/2014 | Funk et al. |
| 8,712,686 B2 | 4/2014 | Bandyopadhyay et al. |
| 8,751,151 B2 | 6/2014 | Funk et al. |
| 8,812,015 B2 | 8/2014 | Das et al. |
| 9,148,764 B2 | 9/2015 | Das et al. |
| 9,733,091 B2 | 8/2017 | Kordari et al. |
| 9,759,561 B2 | 9/2017 | Young et al. |
| 10,088,313 B2 | 10/2018 | Young et al. |
| 11,337,034 B1* | 5/2022 | Doty ............... G01S 19/396 |
| 12,136,277 B2* | 11/2024 | Al-Husseini ......... G06V 10/751 |
| 2004/0021569 A1 | 2/2004 | Lepkofker et al. |
| 2005/0242947 A1 | 11/2005 | Burneske et al. |
| 2007/0121560 A1 | 5/2007 | Edge |
| 2008/0033645 A1 | 2/2008 | Levinson et al. |
| 2008/0077326 A1 | 3/2008 | Funk et al. |
| 2009/0019402 A1 | 1/2009 | Ke et al. |
| 2009/0043504 A1 | 2/2009 | Bandyopadhyay et al. |
| 2009/0060085 A1 | 3/2009 | Nadler et al. |
| 2009/0179869 A1 | 7/2009 | Slotznick |
| 2009/0248304 A1 | 10/2009 | Roumeliotis et al. |
| 2009/0262974 A1 | 10/2009 | Lithopoulos |
| 2009/0321094 A1 | 12/2009 | Thomas |
| 2010/0187406 A1 | 7/2010 | Van Dalen et al. |
| 2010/0305845 A1 | 12/2010 | Alexandre et al. |
| 2011/0032152 A1 | 2/2011 | Lo et al. |
| 2011/0080848 A1 | 4/2011 | Khorashadi et al. |
| 2011/0098921 A1 | 4/2011 | Miller et al. |
| 2011/0172906 A1 | 7/2011 | Das et al. |
| 2011/0182238 A1 | 7/2011 | Marshall et al. |
| 2011/0204895 A1 | 8/2011 | Zeller et al. |
| 2011/0212717 A1 | 9/2011 | Rhoads et al. |
| 2011/0238308 A1 | 9/2011 | Miller et al. |
| 2011/0282622 A1 | 11/2011 | Canter |
| 2012/0021764 A1 | 1/2012 | Enright |
| 2012/0072052 A1 | 3/2012 | Powers et al. |
| 2012/0093408 A1 | 4/2012 | Tang et al. |
| 2012/0143495 A1 | 6/2012 | Dantu |
| 2012/0203453 A1 | 8/2012 | Lundquist et al. |
| 2012/0232795 A1 | 9/2012 | Robertson et al. |
| 2012/0235865 A1 | 9/2012 | Nath et al. |
| 2013/0024117 A1 | 1/2013 | Pavetti et al. |
| 2013/0046505 A1 | 2/2013 | Brunner et al. |
| 2013/0096817 A1 | 4/2013 | Fauci et al. |
| 2013/0131985 A1 | 5/2013 | Weiland et al. |
| 2013/0179067 A1 | 7/2013 | Trowbridge et al. |
| 2013/0267260 A1 | 10/2013 | Chao et al. |
| 2013/0293416 A1 | 11/2013 | Waters et al. |
| 2013/0311134 A1 | 11/2013 | Kordari et al. |
| 2013/0321391 A1 | 12/2013 | Troy et al. |
| 2013/0331121 A1 | 12/2013 | Bandyopadhyay et al. |
| 2013/0332064 A1 | 12/2013 | Funk |
| 2013/0332065 A1 | 12/2013 | Hakim et al. |
| 2013/0345967 A1 | 12/2013 | Pakzad |
| 2014/0002307 A1 | 1/2014 | Mole et al. |
| 2014/0139375 A1 | 5/2014 | Faragher et al. |
| 2014/0141796 A1 | 5/2014 | Marti et al. |
| 2014/0156180 A1 | 6/2014 | Marti et al. |
| 2014/0162686 A1 | 6/2014 | Lee et al. |
| 2015/0005000 A1 | 1/2015 | Gyorfi et al. |
| 2015/0031390 A1 | 1/2015 | Robertson et al. |
| 2015/0097731 A1 | 4/2015 | Russell |
| 2015/0153182 A1 | 6/2015 | Tu et al. |
| 2015/0346317 A1 | 12/2015 | Patel et al. |
| 2021/0003229 A1* | 1/2021 | Karatsinides ....... F16K 31/0658 |
| 2021/0107537 A1* | 4/2021 | Ross ................. B61L 25/026 |
| 2021/0311203 A1* | 10/2021 | Reis ................... G01S 19/21 |
| 2022/0055655 A1* | 2/2022 | Navas Sanchez ..... G01C 21/04 |
| 2022/0066015 A1* | 3/2022 | Burghardt ............ G01S 13/582 |

FOREIGN PATENT DOCUMENTS

| | | |
|---|---|---|
| WO | WO 2012/050932 A1 | 4/2012 |
| WO | WO 2012/072957 A1 | 6/2012 |

OTHER PUBLICATIONS

U.S. Appl. No. 13/616,350, filed Sep. 14, 2012, Bandyopadhyay et al.

U.S. Appl. No. 13/616,370, filed Sep. 14, 2012, Bandyopadhyay et al.

U.S. Appl. No. 13/616,408, filed Sep. 14, 2012, Bandyopadhyay et al.

U.S. Appl. No. 14/262,618, filed Apr. 25, 2014, Funk et al.

U.S. Appl. No. 14/262,627, filed Apr. 25, 2014, Funk et al.

U.S. Appl. No. 61/658,883, filed Jun. 12, 2012, Bandyopadhyay et al.

U.S. Appl. No. 61/783,799, filed Mar. 14, 2013, Karvounis et al.

U.S. Appl. No. 61/783,908, filed Mar. 14, 2013, Funk et al.

U.S. Appl. No. 61/792,856, filed Mar. 15, 2013, Funk et al.

Jolliffe; "Principal Component" 2nd edition; New York; 2002; p. 1-519.

Turk et al.; "Face Recognition Using Eigenfaces"; Vision and Modeling Group; IEEE; 1991; p. 586-591.

Tommasini et al.; "Making Good Features Track Better"; IEEE Computer Vision and Pattern Recognition; 1998; 6 pages.

Thrun et al.; "The Graph SLAM Alogrithm with Applications to Large-Scale Mapping of Urban Structures"; International Journal on Robotics Research; vol. 25 No. 6; 2006; p. 403-429.

Thrun et al.; "A Probabilistic Approach to Concurrent Mapping and Localization for Mobile Robots"; Machine Learning and Autonomous Robots; 31/5; 1998; 25 pages.

Stanley; Implementation of Kalman Filter to Tracking Custom Four-Wheel Drive Four-Wheel-Steering Robotic Platform; Univ or Maryland; Master Thesis; 2010; 96 pages.

Noguchi et al.; "A Surf-based Spatio-Temporal Feature for Feature-fusion-based Action Recognition" Trends and Topics in Computer Vision; 2012; 14 pages.

Napora; "Implementation, Evaluation, and Applications of Mobile Mesh Networks for Platforms in Motion"; Univ of Maryland; Master Thesis; 2009; 105 pages.

Mahalanobis; "On the Generalized Distance in Statistics"; Proceedings of the National Institute of Sciences of India; vol. 2 No. 1; Apr. 1936; p. 49-55.

Lemaire et al.; "SLAM with Panoramic Vision"; Journal of Field Robotics; vol. 24 No. 1-2; Feb. 2007; 30 pages.

Jensfelt et al.; "A Framework for Vision Based Bearing only 3D SLAM" IEEE Int. Conf. on Robotics and Automation; May 2006; p. 1944-1950.

Harris et al.; "A Combined Corner and Edge Detector"; Proceedings of the 4th Alvey Vision Conference; 1988; p. 147-151.

Gregory et al.; "Fast and Accurate Collision Detection for Haptic Interaction Using a Three Degree-of-Freedom Force-Feedback Device"; Computational Geometry, 2000; 24 pages.

Whyte; "Uncertain Geometry in Robotics"; IEEE Journal of Robotics and Automation; vol. 4 No. 1; Feb. 1988; p. 23-31.

Davison et al.; MonoSLAM: Real-Time Single Camera SLAM; IEEE Transactions on Pattern Analysis and Machine Intelligence; vol. 29 No. 6; Jun. 2007; 16 pages.

Bouguet; "Pyramidal Implementation of the Lucas Kanade Feature Tracker Description of the Algorithm"; Intel Corporation; 2001; 9 pages.

Bailey et al.; "Simultaneous Localization and Mapping (SLAM); Part II"; IEEE Robotics and Automation Magazine; vol. 13 No. 3; Sep. 2006; p. 108-117.

(56) References Cited

OTHER PUBLICATIONS

Chong et al.; "Feature-based Mapping in Real, Large Scale Environments using an Ultrasonic Array"; The International Journal of Robotics Research; vol. 18 No. 1; Jan. 1999; 44 pages.

DeSouza et al.; "Vision for Mobile Robot Navigation: A Survey"; IEEE Transactions on Pattern Analysis and Machine Intelligence; vol. 24 No. 2; Feb. 2002; p. 237-267.

Mourikis et al.; "SC-KF Mobile Robot Localization: A Stochastic Cloning Kalman Filter for Processing Relative-State Measurements"; IEEE Transactions on Robotics; vol. 23 No. 4; Aug. 2007; p. 717-730.

"Parallel Programming and Computing Platform"; www.nvidia.com/object/cuda.sub.--home.html; NVIDIA; 2009; accessed Oct. 23, 2012; 4 pages; no authors.

"Developing apps for Windows Phone or Xbox"; http://create.msdn.com; Microsoft; © 2012; accessed Oct. 23, 2012; 2 pages; no authors.

"OpenCV (Open Source Computer Vision)"; http://opencv.willowgarage.com/wiki/Welcome?action=print; Intel; 2009; accessed Oct. 23, 2012; 2 pages; no authors.

Teschner et al.; "Optimized Spatial Hashing for Collision Detection of Defromable Objects"; Vision Modeling and Visualization; Korea University; 2003; 39 pages.

Bay et al.; "Speeded-Up Robust Features (SURF)"; Computer Vision and Image Understanding; vol. 110 No. 3; 2008; p. 346-359.

Whyte et al.; "Simultaneous Localization and Mapping: Part I"; IEEE Robotics & Automation Magazine; Jun. 2006; p. 99-108.

Bradley et al.; "Face Tracking and Pose Approximation" Computer Research Association; Aug. 2009; 7 pages.

Gregory et al.; "A Framework for Fast and Accurate Collision Detection for Haptic Interaction"; IEEE Proceedings of Virtual Reality; 1999; 8 pages.

"TRX 3-D Tracking System"; http://www.trxsystems.com; TRX Systems, Inc.; 2009; 2 pages; No Author.

Kabasch; A discussion of the solution for the best rotation to relate two sets of vectors; Acta Crystallographica; vol. 34; Sep. 1978; p. 827-828.

European Patent Application No. 13803670.2; Extended Search Report; dated Jan. 25, 2016; 7 pages.

\* cited by examiner

SYSTEMS AND METHODS FOR REDUNDANT INTEGRITY MONITORING

CROSS REFERENCE TO RELATED APPLICATIONS

This application claims benefit under 35 U.S.C. § 119(e) of Provisional U.S. Patent Application No. 63/236,559, filed Aug. 24, 2021, the contents of which is incorporated herein by reference in its entirety.

GOVERNMENT RIGHTS

This invention was made with government support under Contract No. W31P4Q-20-C-0007 awarded by the U.S. Army Combat Capabilities Development Command Aviation & Missile Center. The government has certain rights in the invention

FIELD OF THE INVENTION

The disclosure relates to systems, computer program products, and methods for validating the output of navigation solution systems.

BACKGROUND

Navigation solution systems are capable of providing navigation solutions without human intervention in environments where global navigation solution systems (GNSS) services are available and in environments where GNSS (or other) sensors might be compromised, contested, degraded, or denied.

Because of increased concern with GNSS interference, many modern navigation solutions rely on multiple sensors for position, navigation, and timing (PNT) including accelerometers, gyroscopes, barometric pressure sensors, magnetic sensors, computer vision, LiDAR, and others. Any of these sensors could have faults or other integrity issues that would affect the accuracy of the computed location and timing output if not detected and eliminated as an input to the solution.

SUMMARY

The disclosure is directed to systems, computer program products, and methods for detecting and compensating for GNSS interference. GNSS interference may result from environmental interference or from electronic signal interference. GNSS location input may be adapted or rejected when interference is detected. The disclosed system can monitor the accuracy, as well as the integrity, of all navigation sensors. The disclosed system can also automatically eliminate the faulty or compromised data from the final navigation solution.

DETAILED DESCRIPTION

The disclosed system includes computer program products, and methods for detecting and compensating for GNSS interference. GNSS interference may result from environmental interference or from electronic signal interference. GNSS location input may be adapted or rejected when interference is detected. The system can monitor the accuracy, as well as the integrity, of all navigation sensors. The system can also automatically eliminate the faulty or compromised data from the final navigation solution.

Figure 1:
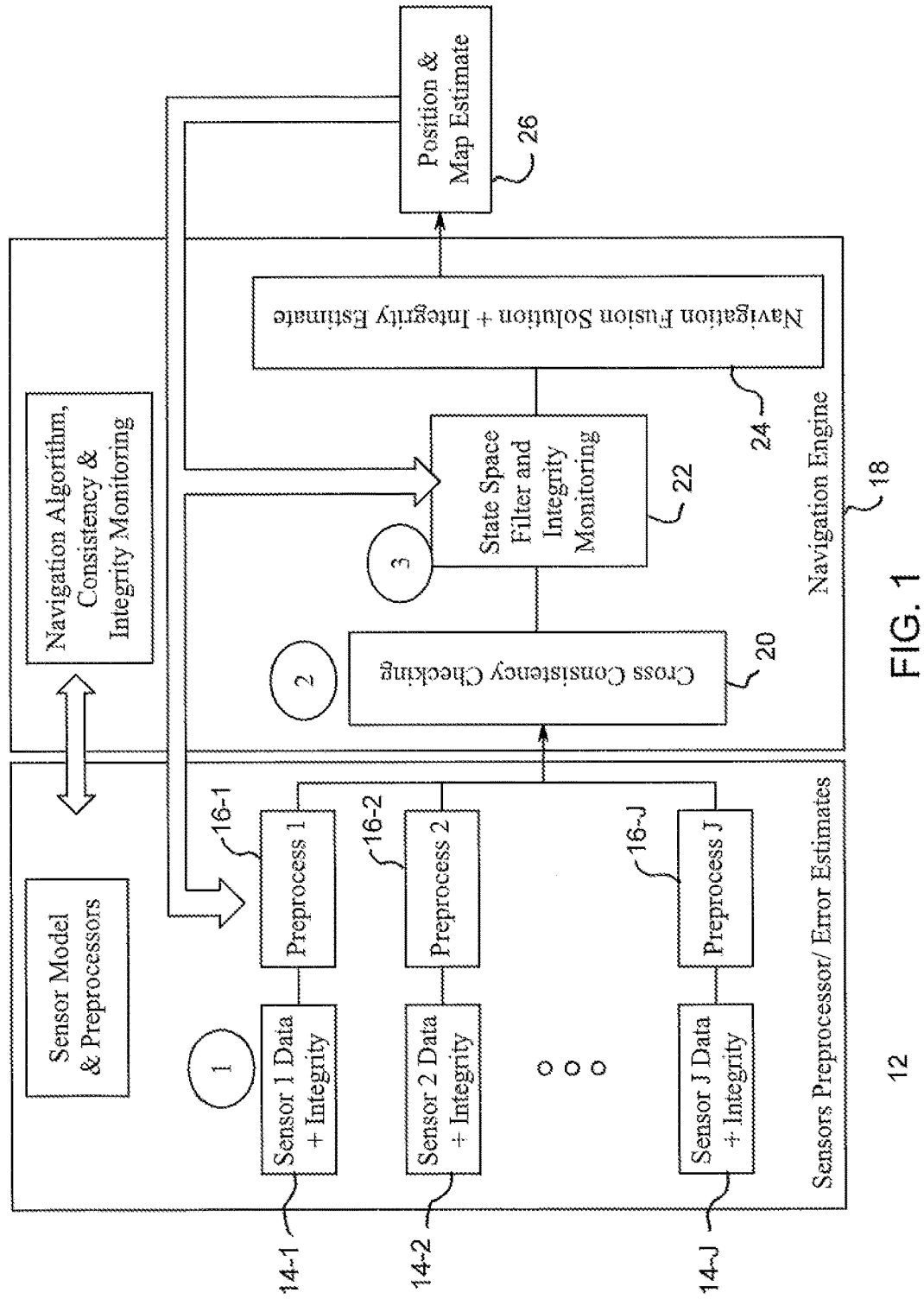
FIG. 1 is an exemplary illustration of a navigation solution manager architecture with redundant integrity monitoring.

FIG. 1 shows a navigation solution manager integrity monitoring architecture 10 that provides three levels of redundant integrity monitoring. The three monitoring levels are indicated by the labels 1, 2 and 3 in FIG. 1.

The sensors preprocessor/error estimates 12 include the first level of integrity monitoring indicted by label 1 of FIG. 1 may include data from a number of individual sensors/systems 14-1, 14-2 . . . 14-J as well as integrity information from each one. The integrity information may be preprocessed by preprocess 16-1, 16-2 . . . 16-J and individual sensor or system constraint integrity estimates may then be input to the navigation engine or navigation fusion engine 18. For example, the preprocessed constraint integrity estimates may include sensor bounds checks, image feature motion consistency, raw GNSS checks, and more complex monitoring systems such as GNSS receiver autonomous integrity monitoring (RAIM).

The second level of integrity monitoring is indicated by label 2 of FIG. 1, which may include cross consistency checks 20 between sensors that can add further insight into sensor integrity. For example, comparing gyro and magnetic based headings may be used to determine if the magnetic sensors are properly calibrated or where magnetic sensors are experiencing external disturbances. Likewise, comparing GNSS motion to motion from inertial tracking sensor or GNSS location to a collaborative location constraint from a trusted source (i.e., a range to a beacon or other tracked entity with good location) may provide an indication of GNSS interference.

The third level of integrity monitoring indicated by label 3 of FIG. 1 may be a system theoretic approach, such as may be applied through state space filters (i.e., Bayesian filters such as Kalman filters and particle filters) measuring changes in uncertainty in the state space domain after any sensor input is applied and further integrity monitoring 22. Large changes in uncertainty are an indication that the sensor input may be compromised. Warnings from state space filter and integrity monitoring 22 may be monitored in combination with level 1 and level 2 integrity to automatically adjudicate the trust of the signal. State divergence monitoring has the benefit, because it is applied in the state space domain, that it will work with any sensor input.

Based on these three levels of integrity monitoring input, the navigation fusion engine 18 may then need to guide how the inputs are fused with the navigation solution and an integrity estimate 24 are generated and output as a position and map estimate 26. In other words, there is a need for a method for automatically adjudicating whether a sensor input is to be used in the navigation solution.

Automatic Integrity Adjudication

The integrity estimate for each sensor may indicate the probability that the input from that sensor should be trusted. An integrity estimate with a value of 1, for example, may mean the measurement should be trusted with 100% certainty and the navigation engine should use that sensor input without modification. On the other hand, an integrity estimate with a value of 0 may mean with 100% certainty that the measurement is compromised and should NOT be trusted. In such a case, the navigation engine should ignore that sensor's input. Naturally, the integrity estimate may come anywhere between 1 and 0.

How to handle inputs with integrity estimate values between 0 and 1 is more complex. Based on a single input, it is unclear whether to trust a sensor. For example, if a GPS input has an integrity value of 0.55—meaning that GPS should be trusted with probability 0.55 (and not trusted with probability 0.45)—it would be risky to fuse this GPS location into the navigation solution without further validation. Multilevel integrity monitoring as shown in FIG. 1 is required to automatically adjudicate whether to trust the sensor input.

Given the uncertainty of whether to trust the sensor input, one approach may be to independently preserve a solution both with and without the potentially compromised senor input constraint—until more certainty is developed as to which solution to trust based on other levels of integrity monitoring. The questionable input can be removed from the solution provided to the user, while simultaneously tracking the solution with the input in the background allowing further evaluation of whether to trust the sensor. By preserving both solutions, the system can provide a trusted solution without the questionable input until the trust associated with that particular input is further validated by subsequent integrity monitoring.

In a particle filter, the integrity probability can be split between solutions by adjusting the number of particles tracking each solution. For example, particles can be randomly split into two groups based on the input senor integrity. Particles in the trust group may have the questioned constraint applied (e.g., a GPS constraint), while particles in the non-trust group may not—thus tracking the solution with and without the questionable input constraint. In another filter, such as a Kalman filter, the integrity probability may be managed by tracking multiple solutions and adjusting the weight given to each solution.

This concept may be extended to tracking the integrity of multiple sensors with integrity less than 1 by adding solutions for each sensor in question. Tracking all combinations of sensors may be too computationally expensive as the solutions tracked would grow exponentially as $2^N$, where N is the number of sensors with uncertain integrity. A more realistic approach involves tracking only 2+N solutions as follows:

1. With none of the questionable sensors: This solution may have high integrity but may also have high uncertainty with all of the questionable sensors removed.
2. With all trusted sensors+each of the N questionable sensors independently: This solution may be validated against the prior solution with none of the questionable sensors. The solution integrity would be a function of the questionable sensor.
3. The full solution with all sensors: This solution may allow the navigation system to quickly jump to the solution with all sensors if the sensors are validated. The solution integrity may be a function of the set of questionable sensors. The full solution may also be eliminated, and instead, the system rewound adding the validated constraints. In such a situation, the full solution may only be computed if the sensor is validated.

Figure 2:
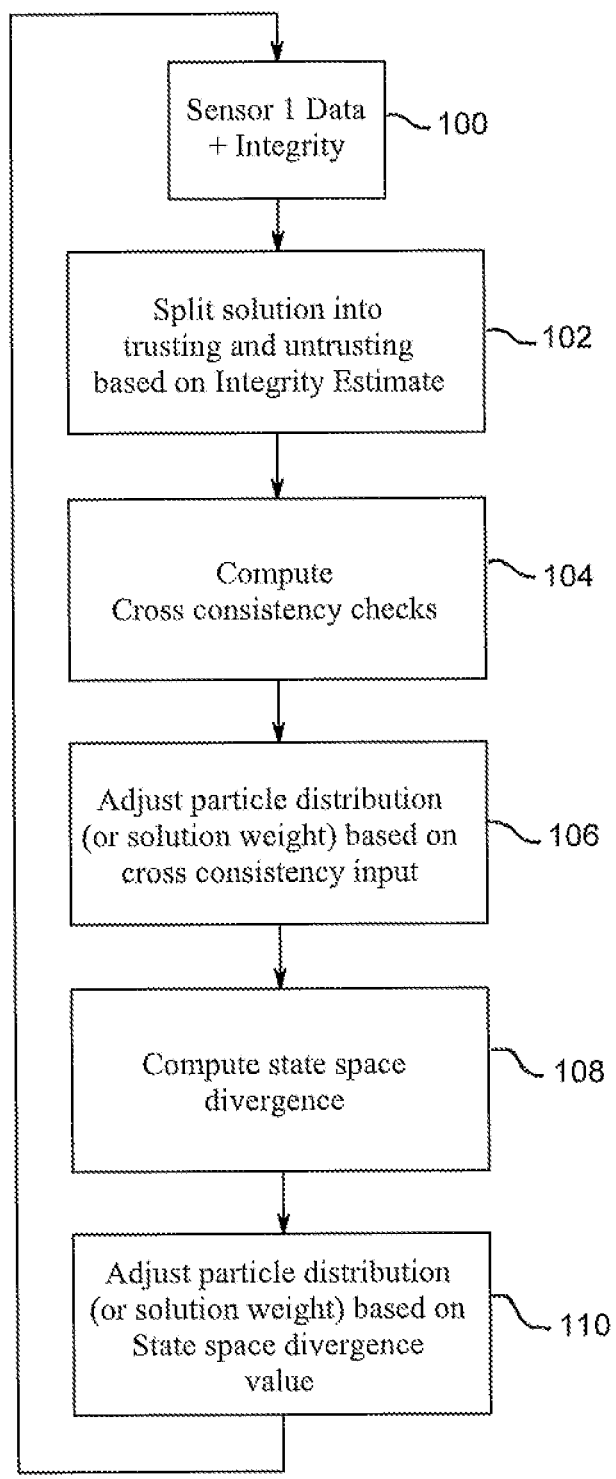
FIG. 2 is an exemplary illustration of an automatic integrity adjudication flow chart.

The process of automatic integrity adjudication, with respect to a single sensor, may be illustrated by reference to FIG. 2. Input data from the sensor and an integrity estimate is received in step 100 and processed to split the solution into trusting solution and untrusting solution based on the integrity estimate in step 102. Cross consistency checks are then performed in step 104, and the particle distribution (or solution weight), depending on whether particle filters or Kalman filters are being used, may be adjusted based on the cross consistency input in step 106. The state space divergence may then be computed in step 108, and the particle distribution (or solution weight) may be further adjusted based on the state space divergence value in step 110.

Interpretation of the Integrity Parameter

A change in the integrity value may reflect a change in the assessment of the underlying integrity threat. The assessment may change because there has been more time to analyze the signals (i.e., a change in the assessment alone) or because the threat itself has changed and as a result the input sensor integrity changes (e.g., spoofing switched on or off, the entity being tracked entering or leaving the area where the threat is present, etc.). For purposes of navigation, these differences may affect how the correlation between trust and distrust over time should be considered.

In the particle filter, fully correlated trust may mean that the same group of particles should trust a constraint that comes in at different times. Fully uncorrelated trust may mean that the trusting and untrusting groups of particles on each constraint input should be randomly reassigned.

It may be desirable to maintain the trust and non-trust groups for the duration of an incident and thus keep the integrity values correlated from constraint to constraint during an incident. The constraints will lose correlation slowly over time, or once the integrity returns to 1 allowing a different random group of particles to be selected. That is, if the constraint has an integrity value of 0.5, then a while later has an integrity value of 1.0, and later still goes to 0.5 again, we may assume that the correlation was lost when the integrity went to 1.0—that is, there is no need to maintain the same groups of trusting and untrusting particles for the two separate periods with integrity 0.5.

By maintaining correlation during an incident, the particles in the trust group may remain the same core group, growing or shrinking in number as the trust score changes over some time period. In this way, if trust ends up diminishing (for example, if GPS spoofing is detected), the solution following GPS may eventually be filtered out (by reducing the number of particles in the trust group as the integrity decreases). The non-trust solution, which eliminated the bad constraint as soon as trust was questioned (reduced from 1.0), may contain the true solution which was unaltered by the bad sensor input.

Integrity Monitoring Example

Figure 3:
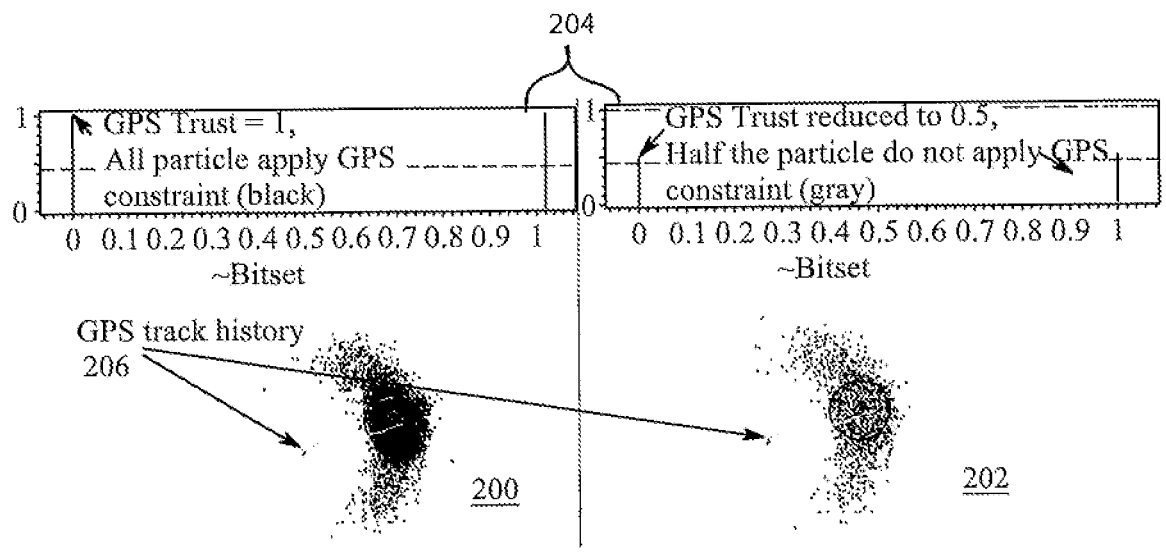
FIG. 3 is an exemplary illustration of a particle filter implementation of an integrity monitoring solution flow chart illustrating one example of a method for adjusting GNSS input to a fusion solution.

A software implementation of such a solution may be demonstrated below and with reference to FIG. 3, using a particle filter implementation. The example illustrated in FIG. 3 shows a simulation during which the GPS sensor integrity changes at two points (based on level 1 integrity monitoring). As described above, the software may also automatically adjust the internal trust score (adjusting the number of particles that trust GPS), separately from the GPS sensor integrity estimates. These automatic adjustments may be based on cross consistency of sensor input between GPS, inertial sensors, compass, user corrections, and ultra-wide-band (UWB) ranging (level 2 integrity monitoring—and this could similarly be done for level 3 integrity monitoring). Below are some key points showing the system's ability to automatically adjudicate integrity:

Tracking simulation begins: Solution system is initialized with fully trusted GPS.

5 minutes into the simulation: The GPS integrity estimate is reduced from 1.0 to 0.5 to reflect a change in the GPS integrity. The left side of FIG. 3 shows a plot 2009 of the particle cloud immediately before the change occurs, with a GPS trust of 1.0, while the right side of FIG. 3 shows the plot 202 of the particle cloud immediately after the change occurs, with the GPS trust lowered to 0.5. In each of the plots 200 and 202, the trust parameter is represented in the graph 204 positioned above each plot. The graph 204 ranges from 0 to 1.0 in 0.1 increments. The graph 204 indicates the integrity parameter of particles trusting GPS on the left and not trusting GPS on the right. Black particles are utilized to indicate particles that trust GPS, which immediately prior to the change are at an integrity parameter of 1.0. Gray particles are utilized to indicate particles that do not trust GPS, which after the change represents an integrity parameter of 0.5 (i.e., there is an approximately equal plotting of black and gray particles). A squiggly line associated with each plot illustrates the GPS track history 206, which at this point in the simulation is—150-meters of GPS locations. GPS is only applied to the black particles, while all other constraints, including inertial sensors, compass, user corrections, and UWB ranges, are applied to both sets of particles.

Figure 4:
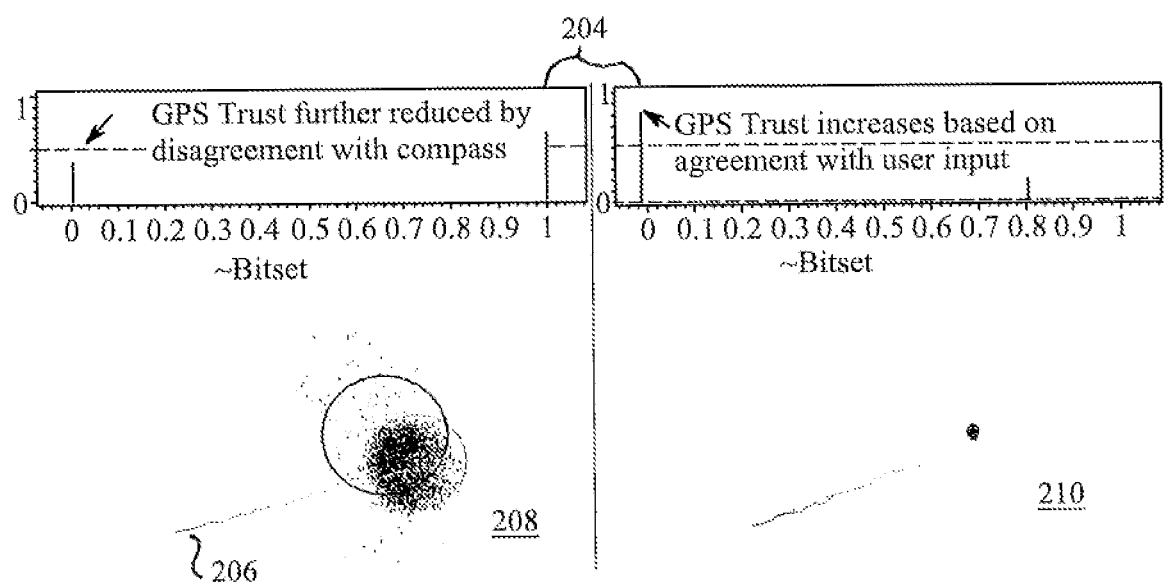
FIG. 4 is an exemplary illustration of a particle filter implementation of an integrity monitoring solution with user input.

5½ minutes into the simulation: After the integrity parameter drops to 0.5, there may be some separation between the untrusting and trusting particles, which is illustrated by the particle plot 208 on the left side of FIG. 4. In the simulation, for example, a compass heading sensor input may disagree slightly with a compass heading input from GPS. As a result, the navigation filter may automatically de-weight the GPS trusting particles relative to the untrusting ones, dropping the integrity parameter of trust particles to 0.4 and increasing the integrity parameter of not trust particles to 0.6. The GPS track history 206 path in the simulation is now approximately 550 meters.

6 minutes into the simulation: The user corrects their position to a known location on a map. Since the correction agrees more with the GPS trusting particles than the untrusting particles, the system automatically adjusts the integrity parameter in the graph 204 for particles that trust GPS more (to 0.8) and reducing the integrity parameter for particles that do not trust (to 0.2), which is illustrated by the plot 210 on right side of FIG. 4.

Figure 5:
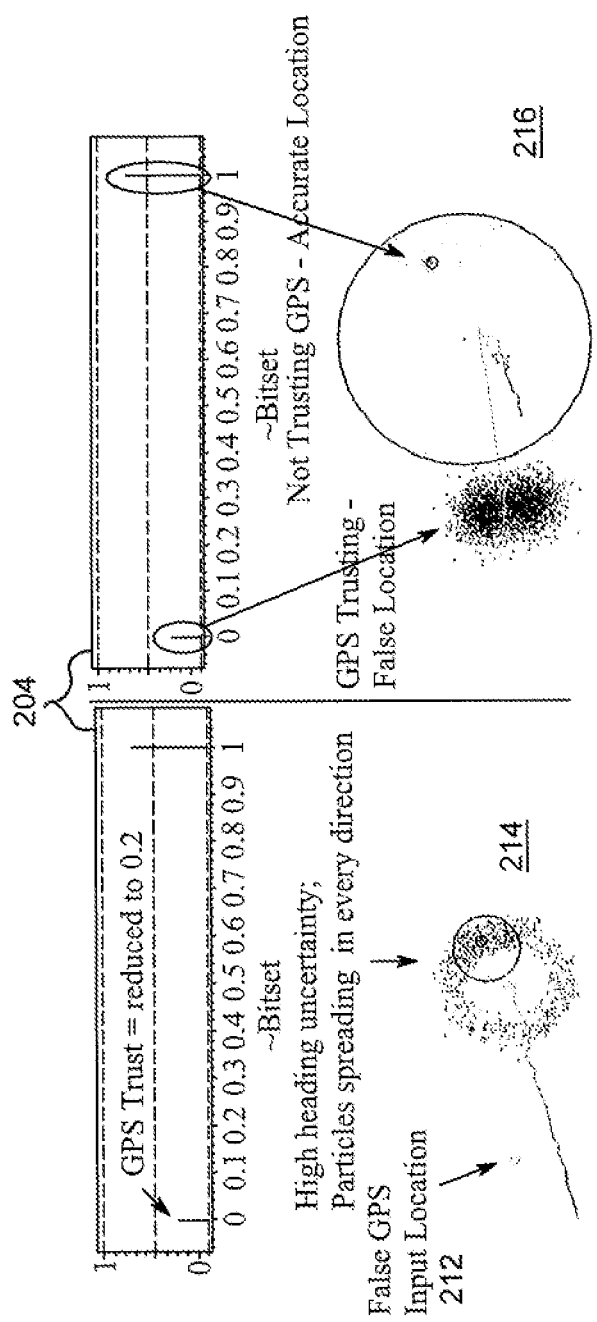
FIG. 5 is an exemplary illustration of a particle filter implementation of an integrity monitoring solution accounting for GPS interference.

A few minutes later into the simulation: GPS interference begins, resulting in a false GPS input location 212 in the plot 214. As a result, the GPS integrity parameter drops to 0.2, as illustrated by the left side of FIG. 5. The number of black trusting particles is reduced and the number of gray particles not trusting GPS is increased.

~2 minutes later into the simulation: The GPS trusting particles have all jumped to the area of the false GPS location 212, as shown on the right side of FIG. 5. The jump is a result of the cross-consistency checks with the inertial sensors that initially delayed capture of GPS trusting particles for minutes. In this simulation, heading uncertainty has also been introduced by a second user correction that disagrees with the first one user correction. As a result, particles have begun to spread in every direction, as further illustrated by plot 216 of the right side of FIG. 5. Still, the untrusting solution remains accurate based on the inertial sensors. Without the introduction of the heading uncertainty, the cross-consistency checks with the inertial sensors plus a compass solution would have eliminated the false GPS location as a possibility.

Figure 6:
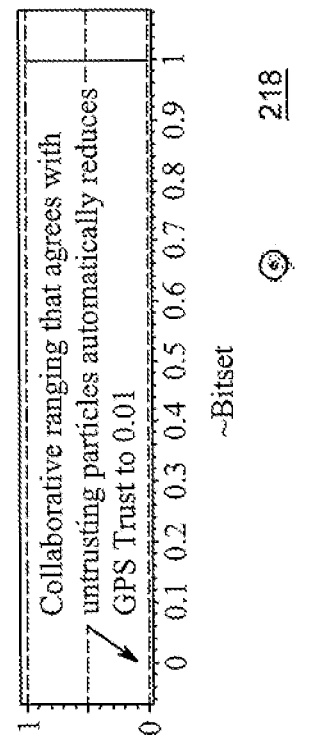
FIG. 6 is an exemplary illustration of a particle filter implementation of an integrity monitoring solution after a series of ultra-wideband collaborative ranging constraints correct all particle to match untrusting particles.

Finally: A series of UWB collaborative ranging constraints correct all particles to match with the untrusting particles (this simulates a beacon or collaboration with another entity with trusted location). The system automatically adjusts to 99% distrust of the repeated GPS location, as shown by plot 218 in FIG. 6.

This example demonstrates the ability of a navigation filter to use the level 1 integrity input from a sensor to track both a trusting and non-trusting solution and to automatically adapt the trust of the sensor based on level 2 cross consistency with compass, user input and collaborative UWB ranging input. This example could be easily extended to similar accounts for level 3 integrity inputs. For example, the addition of state divergence monitoring (level 3) may have enabled detection of the significant solution distribution change caused by the trusting particles being captured and may have been able to reject that solution without the need for collaborative input.

By further splitting the particles, multiple level 1 integrity issues could be simultaneously tracked and adjudicated based on level 2 and level 3 integrity monitoring inputs.

Figure 7:
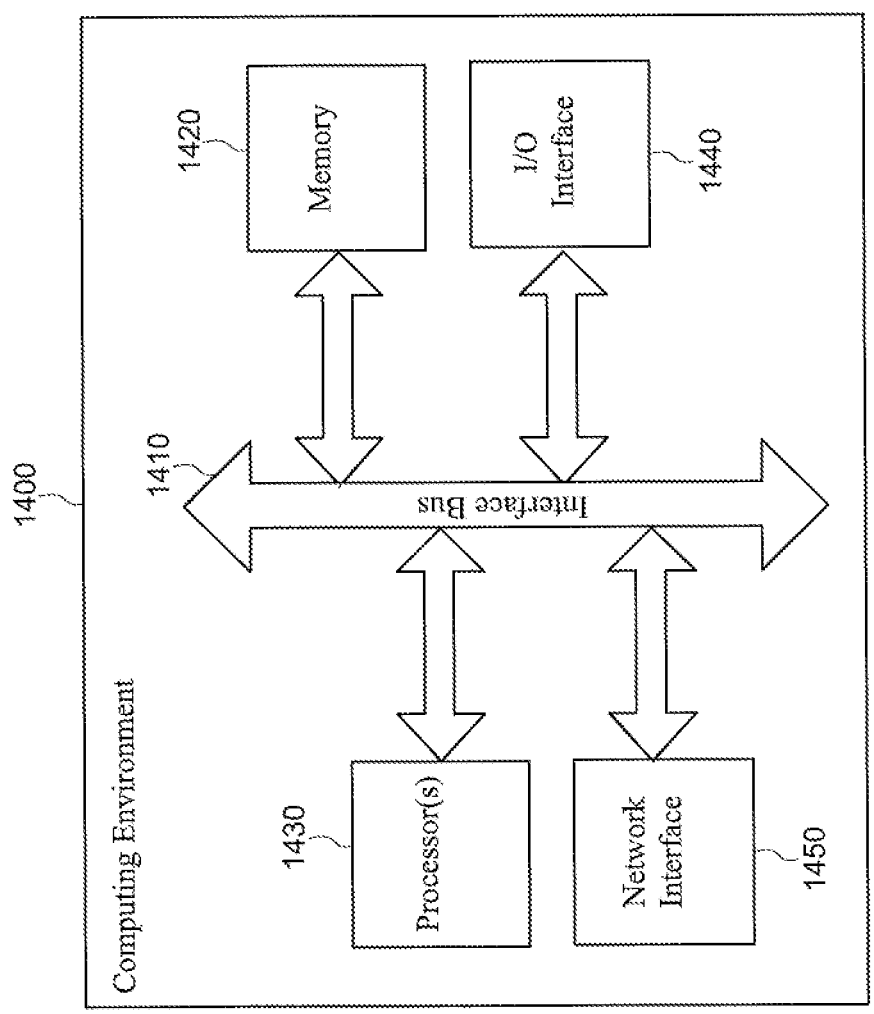
FIG. 7 depicts an exemplary computing environment.

FIG. 7 illustrates an exemplary computing environment in which embodiments of the present disclosure may be depicted and generally referenced as computing environment 1400 in which the software may be implemented. As utilized herein, the phrase "computing system" generally refers to a dedicated computing device with processing power and storage memory, which supports operating software that underlies the execution of software, applications, and computer programs thereon, such as a mobile device being tracked in the simulations of FIGS. 1-6. As shown by FIG. 7, computing environment 1400 includes bus 1410 that directly or indirectly couples the following components: memory 1420, one or more processors 1430, I/O interface 1440, and network interface 1450. Bus 1410 is configured to communicate, transmit, and transfer data, controls, and commands between the various components of computing environment 1400.

Computing environment 1400, such as a PC or smart phone, typically includes a variety of computer-readable media. Computer-readable media can be any available media that is accessible by computing environment 1400 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information, and which can be accessed by computing environment 1400.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 1420 includes computer-storage media in the form of volatile and/or nonvolatile memory. The memory may be removable, non-removable, or a combination thereof. Memory 1420 may be implemented using hardware devices such as solid-state memory, hard drives, optical-disc drives, and the like. Computing environment 1400 also includes one or more processors 1430 that read data from various entities such as memory 1420, I/O interface 1440, and network interface 1450.

I/O interface 1440 enables computing environment 1400 to communicate with different input devices and output devices. Examples of input devices include a keyboard, a pointing device, a touchpad, a touchscreen, a scanner, a microphone, a joystick, and the like. Examples of output devices include a display device, an audio device (e.g., speakers), a printer, and the like. These and other I/O devices are often connected to processor 1410 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 1440 is configured to coordinate I/O traffic between memory 1420, the one or more processors 1430, network interface 1450, and any combination of input devices and/or output devices.

Network interface 1450 enables computing environment 1400 to exchange data with other computing devices via any suitable network. In a networked environment, program modules depicted relative to computing environment 1400, or portions thereof, may be stored in a remote memory storage device accessible via network interface 1450. It will be appreciated that the network connections shown are exemplary and other means of establishing a communications link between the computers may be used.

It is understood that the term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general-purpose processing unit(s). Additionally, computer executable instructions embodying aspects of the disclosure may be stored in ROM EEPROM, hard disk (not shown), RAM, removable magnetic disk, optical disk, and/or a cache of processing unit. A number of program modules may be stored on the hard disk, magnetic disk, optical disk, ROM, EEPROM or RAM, including an operating system, one or more application programs, other program modules and program data. It will be appreciated that the various features and processes described above may be used independently of one another or may be combined in various ways. All possible combinations and sub-combinations are intended to fall within the scope of this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method for automatically adjudicating sensor input for use in a navigation solution, comprising:
   identifying N potentially compromised sensor inputs, generating a first navigation solution including trusted sensor input and without the N potentially compromised sensor inputs, and outputting the first navigation solution; and
   utilizing one or more levels of integrity monitoring, including computing a state divergence value within a state space filter based on changes in uncertainty after sensor input is applied, to determine if one or more of the N potentially compromised sensor inputs can be validated, generating at least a second navigation solution including the trusted sensor input and with one or more of the N potentially compromised sensor inputs, and
   based on a validation, automatically eliminating non validated sensor inputs and outputting the second navigation solution as a position and map estimate for use in a navigation system, including applying the second navigation solution to constrain further state updates within the state space filter.

2. The method of claim 1, wherein the first navigation solution and the second navigation solution are generated by a particle filter that contains a first set of particles that do not apply the N potentially compromised sensor inputs and a second set of particles that apply one or more of the N potentially compromised sensor inputs.

3. The method of claim 2, wherein the utilizing one or more levels of integrity monitoring includes maintaining first integrity values for sensor inputs in the first set of particles and second integrity values for the second set of particles and correlating the first integrity values and the second integrity values from new sensor input to new sensor input throughout a duration of a period.

4. The method of claim 1, wherein the first navigation solution and the second navigation solution are generated by a Kalman filter, wherein the Kalman filter does not apply the N potentially compromised sensor inputs to derive the first navigation solution, wherein the N potentially compromised sensor inputs are applied to one or more additional navigations solutions including the second navigation solution, wherein each of the one or more additional navigation solutions applies a different weight based on application of the N potentially compromised sensor inputs.

5. The method of claim 1, wherein the utilizing one or more levels of integrity monitoring includes a plurality of navigation solutions, wherein each navigation solution among the plurality of navigation solutions includes the trusted sensor input and a different sensor input among the N potentially compromised sensor inputs and includes a full navigation solution that includes the trusted sensor input and each of the N potentially compromised sensor inputs.

6. The method of claim 5, wherein the full navigation solution is utilized as the navigation solution when all of the sensor inputs are validated.

7. The method of claim 5, wherein the full navigation solution is eliminated and rewound including only the trusted sensor input when all of the sensor inputs are not validated.

8. A computer-implemented method for automatically adjudicating sensor input for use in a navigation solution, comprising:
   receiving, by a computing device comprising a processor and memory, input data from a sensor and a preprocessed integrity estimate of the input data;
   executing, by the computing device, a state space filter configured to generate a navigation solution based on the input data;
   splitting the navigation solution within the state space filter into a trusting solution and an untrusting solution based on the preprocessed integrity estimate;
   performing, by the computing device, a cross consistency check of the trusting solution and the untrusting solution based on input data from at least one additional sensor;
   adjusting, by the computing device, the state space filter based on the cross consistency check;
   computing, by the computing device, a divergence within the state space filter based on changes in uncertainty after sensor input is applied, wherein the divergence comprises at least one of a difference in estimated position, velocity, or uncertainty covariance;
   automatically determining, by the computing device, whether the divergence exceeds a predetermined threshold, and in response, updating a trust score associated with the sensor input;
   adjusting, by the computing device, a weighting of the sensor input in the state space filter based on the updated trust score;
   fusing all, by the computing device, part or none of the trusting solution and the untrusting solution into the navigation solution based on the updated trust score;
   based on the updated trust score indicating the sensor input is not validated, automatically eliminating the sensor input from participation in the navigation solution; and
   outputting, by the computing device, the navigation solution as a position and map estimate for use in a navigation system, including applying the navigation solution in subsequent navigation processing by adjusting the state space filter and constraining subsequent state updates based on the navigation solution.

9. The method of claim 8, wherein the state space filter is a particle filter that contains a first set of particles corresponding to the untrusting solution and a second set of particles corresponding to the trusting solution.

10. The method of claim 9, wherein the performing a cross consistency check includes maintaining first integrity values for sensor inputs in the first set of particles and second integrity values for the second set of particles and correlating the first integrity values and the second integrity values from new sensor input to new sensor input throughout a duration of a period.

11. The method of claim 9, wherein the adjusting the state space filter based on the cross consistency check and the adjusting the state space filter based on the divergence includes adjusting a first particle distribution of the first set of particles and a second particle distribution of the second set of particles.

12. The method of claim 8, wherein the state space filter is a Kalman filter, wherein the Kalman filter does not apply potentially compromised sensor inputs to derive the untrusting solution, and applies the potentially compromised sensor inputs to derive the trusting solution.

13. The method of claim 12, wherein the adjusting the state space filter based on the cross consistency check and the adjusting the state space filter based on the divergence includes adjusting a solution weight of the untrussing solution and the trusting solution.

* * * * *